United States Patent [19]

Ceaser et al.

[11] Patent Number: 5,612,385
[45] Date of Patent: Mar. 18, 1997

[54] AERATED FIBROUS FOAM COMPOSITIONS

[76] Inventors: Anthony Ceaser; Mark A. Ceaser, both of P.O. Box 161, Cemetery Rd., Great Meadows, N.J. 07838

[21] Appl. No.: 298,427

[22] Filed: Aug. 30, 1994

[51] Int. Cl.[6] .............. C08L 1/00; C08L 89/00; C08L 5/02
[52] U.S. Cl. .......... 521/68; 106/16; 106/18.11; 106/18.13; 106/18.16; 106/122; 106/136.1; 106/137.1; 106/151.1; 106/152.1; 106/157.5; 106/162.51; 106/162.9; 106/163.01; 106/164.01; 106/164.5; 106/164.53; 106/204.01; 106/162.1; 106/206.1; 106/217.01; 106/238; 106/241; 106/242; 106/409; 106/287.23; 428/311.71; 524/47; 521/70; 521/84.1; 521/85; 521/89; 521/94; 521/149; 523/333; 523/334; 524/10; 524/12; 524/13; 524/18; 524/28; 524/34; 524/35; 524/45
[58] Field of Search .......... 106/122, 16, 18.11, 106/18.13, 18.16, 124, 157, 158, 160, 161, 162, 170, 173.1, 176, 197.2, 200, 203, 204, 212, 213, 214, 238, 241, 242, 287.23, 409; 521/149, 68, 70, 84.1, 85, 89, 94; 523/322, 333, 334; 524/34, 35, 13, 12, 47, 45, 28, 10, 18; 428/311.7

[56] References Cited

U.S. PATENT DOCUMENTS

| | | | |
|---|---|---|---|
| 4,447,560 | 5/1984 | Piersol | 521/68 |
| 4,543,377 | 9/1985 | Crossman | 524/34 X |
| 4,613,627 | 9/1986 | Sherman et al. | 521/68 |
| 5,008,306 | 4/1991 | Goquelin | 523/334 X |
| 5,124,363 | 6/1992 | Stern | 521/68 X |
| 5,288,765 | 2/1994 | Bastioli et al. | 524/47 X |

FOREIGN PATENT DOCUMENTS

| | | | |
|---|---|---|---|
| 0012509 | 5/1979 | Japan | 521/68 |
| 0756645 | 9/1956 | United Kingdom | 521/68 |

*Primary Examiner*—Judy M. Reddick
*Attorney, Agent, or Firm*—Omri M. Behr, Esq.

[57] ABSTRACT

Novel aerated fibrous slurry comprising fibrous material, foaming agent, stabilizer, water and gas, which when dried to a water content of not more than 10% by weight, forms a dry, resilient fibrous foam composition. The dry, resilient fibrous foam composition is useful as an inexpensive cushioning filler, as a heat insulating material and as an absorbent of liquids.

14 Claims, No Drawings

AERATED FIBROUS FOAM COMPOSITIONS

FIELD OF THE INVENTION

The invention concerns novel aerated fibrous slurry compositions and dry, resilient fibrous foam compositions made therefrom.

BACKGROUND OF THE INVENTION

Governmental efforts to encourage recycling of paper and packaging materials began over two decades ago. Since then, large volumes of recycled paper have become available. Several steps involved in the process of paper-making are also used to convert recycled paper to reusable pulp (such as forming an aqueous slurry of paper or wood fibers and spreading these slurries into a thin layer to permit excess moisture to drip out). Therefore, one could have reasonably expected that numerous novel products would be developed based on or incorporating recycled paper.

In fact, paper pulp is mixed with a wide variety of chemical materials in paper-making processes. The chemical materials combined with paper pulp in paper making include surfactants, starch, and polymeric fibers. For example, an anionic surfactant used in the aqueous solvent of U.S. Pat. No. 4,347,100 (at a level of 0.4–0.7% by weight of the weight of cellulose used) is said to remove lignin from cellulose fibers, dispersing the fibers more easily and thoroughly in the pulp. Nonionic surfactants of U.S. Pat. No. 4,766,030 are said to debond wood pulp and improve pulp wettability. The surfactant blend of U.S. Pat. No. 5,139,616 is said to facilitate removal of adhesives from recycled paper pulp to improve the resultant paper. Paper pulp has also been combined with starch (U.S. Pat. No. 4,347,100) and synthetic materials. The pulps of U.S. Pat. No. 5,169,447, derived from combinations of wood and recycled paper, are mixed with at least 0.0007% by dry weight of polymer to improve pulp "freeness" and the quality of the resulting paper.

Surfactants are also used to treat compositions based on synthetic fibers. In U.S. Pat. No. 4,766,939, surfactants are used to lubricate synthetic fibers such as glass. The nonionic alkylene oxide adducts of U.S. Pat. No. 5,232,628 are said to be suitable for treating polymeric fibrous materials.

Although large volumes of cellulose pulp are processed in paper-making in large volumes, gas and air are not to be incorporated into pulp. Indeed, such aeration is to be avoided, according to U.S. Pat. Nos. 4,766,030 and 5,232,628. By contrast, air is introduced into the fibrous slurry of U.S. Pat. No. 4,576,716; it is said to cause fibers suspended in the slurry to become entangled with one another, not to form a stable aerated slurry. These entangled fibers are said to coalesce into fiber lumps, which are then more easily formed into filtration materials when dry.

Because paper pulp is mixed with such a wide variety of chemical materials, one could have reasonably expected that a wide range of conventional products could be modified by incorporation of recycled paper. Commercial products which incorporate recycled paper however tend to have shortcomings which decrease their efficiency or performance. For example, an agricultural ground cover, used to protect newly sown seeds or to prevent weed growth near cultivated crops, comprises an aqueous slurry of paper fibers. These slurries, having a density of 0.3 to 0.7 g/cc, were initially introduced to avoid the need to retrieve conventional cloth ground covers (e.g., burlap) from fields. The seemingly more convenient paper slurry however introduced a significant problem into the use of ground covers: in preparing the paper slurry cover, a precise ratio between the water to paper fiber contents must be met. If the composition is made with even a slight excess of paper, the resulting material is easily displaced by a slight breeze. If however, the composition is made with even a slight excess of water, the resulting ground cover can be too heavy and dense for rain to penetrate or for seedlings to grow through; furthermore, this dense composition may remain as an impediment to cultivation after one growing season.

Another commercial product which incorporates recycled newspaper is cellulose-based heating insulation. This material is comprised of approximately 100 parts by weight of ground newspaper, 35–45 parts by weight of fire retardant and optional components such as dye. The composition is mixed and applied by a blower into wall spaces and has a density of from 3.5 to 4.5 pounds per cubic foot. (0.05–0.06 g/cc). This density and the amount of fire retardant agent needed to impart fire retardancy to the material are undesirably high.

SUMMARY

Applicants have developed two novel materials based on natural and/or synthetic fibers: an aerated fibrous slurry composition, and, when dried to a water content of not more than 10% by weight, forms a dry, resilient fibrous foam composition. The dry, resilient fibrous foam composition is useful as an inexpensive ground cover, cushioning filler, heat insulating material and an absorbent of fluids, e.g., spilled chemicals. Both compositions may be incorporated into a wide variety of materials.

In a first embodiment, the invention is an aerated fibrous slurry composition comprising a) a fibrous slurry composition comprising 10 to 2,500 parts by weight of fibrous material comprising fibers from 1 to 20 mm in length; 0.5 to 25 parts by weight of foaming agent; 1 to 50 parts by weight of stabilizer; and 500 to 25,000 parts by weight of water, wherein the fibrous material, foaming agent and stabilizer together comprise the dry components of the fibrous slurry composition, these dry components comprising from 1 to 10% by weight of the fibrous slurry composition; and b) a volume of gas, equal to 5 to 1,000% of the volume of the fibrous slurry composition, incorporated into the fibrous slurry composition to form the aerated fibrous slurry composition having a density of 0.2 to 0.6 g/cc.

One such aerated fibrous slurry composition comprises a) a fibrous slurry composition comprising 35 to 1,500 parts by weight of fibrous material; 1.5 to 12 parts by weight of foaming agent; 5 to 20 parts by weight of stabilizer; and 1,000 to 20,000 parts by weight of water; wherein the fibrous material and the stabilizer together comprise at least 60% by weight of the dry components' weight and the dry components comprise 3.5 to 7.5% by weight of the fibrous slurry composition; and b) a volume of gas, equal to 10 to 900% of the volume of the fibrous slurry composition, incorporated into the fibrous slurry composition to form the aerated fibrous slurry composition having a density of 0.2 to 0.4 g/cc. The amounts of the components in the fibrous slurry composition correspond to 0.17 to 59% by weight fibrous material; 0.006 to 1.1% by weight foaming agent; 0.02 to 1.8% by weight stabilizer; and 39 to 99% by weight water. The gas is suitably air.

The fibrous materials may be selected from the group consisting of paper, wood, cellulose, hemp, cotton, wool, silk, ramie, bagasse, nylon, glass, acrylic, olefin, polyester and super-absorbent polymeric fibers (such as sodium polyacrylate; or calcium polyacrylate, available commercially as "Gel-Cel" from Gleason Fibers). One particularly suitable fibrous material is newspaper ground to pieces measuring approximately from 0.1 to 5 mm by from 0.1 to 5 mm, (hereinafter "ground newsprint").

The length of the fibrous materials' fibers may be 1 to 20 cm or 5 to 15 cm. The fibrous materials may be reduced to this length by cutting, chopping, grinding or by other conventional steps known in the art. Thus, for example, wood chips may be ground in a conventional grinder to an approximate size of from 0.1 mm to 6 mm by from 0.1 mm to 6 mm.

The foaming agent may suitably be selected from anionic, nonionic and cationic surfactants. Suitable anionic surfactants include alkali metal salts of $C_{10}$–$C_{20}$ fatty acids, alcohol sulfates and alkyl aryl sulfonates, (such as Nacconol 90G, Nacconol ME-Dry and Witconate SK). Suitable nonionic surfactants include alkylene oxide condensates including the ethylene oxide condensate Triton CG 110. Suitable cationic surfactants include alkyl ammonium chlorides.

The aerated fibrous slurry composition may further comprise one or more stabilizers selected from the group consisting of starch, proteins, lignin, natural and synthetic rubber latices, including biodegradable polymeric latices, sodium alginate and carboxymethyl cellulose. Super-absorbent polymeric fibers, identified above as suitable fibrous materials, may also be employed as a stabilizer. These stabilizers increase foam viscosity and thereby stabilize the foam of the aerated fibrous slurry composition.

In certain formulations of the aerated fibrous slurry composition, the stabilizer may be omitted. This formulation still has 1 to 2,500% by weight fibrous material and density of 0.2 to 0.6 g/cc. Due to the absence of stabilizer however, the composition's foam is less stable. Therefore, the composition must be used immediately upon being mixed. In one of these formulations, the fibrous material itself acts as a stabilizer. This occurs when the fibrous material is one of the conventionally known super-absorbent materials, such as calcium polyacrylate (commercially available as "Gel-Cel" from Gleason Fibers). When this fibrous material becomes wet, its fibers swell and increase the fibrous slurry composition's viscosity to as high as 35,000 to 50,000 centipoises. The step of agitating to introduce gas into the composition however reduces the apparent viscosity into the range of 500 to 5,000 centipoises. The formulation has the same uses as those which include stabilizer.

The aerated fibrous slurry composition may further comprise one or more optional components as additives which impart particular characteristics to the aerated fibrous slurry composition as well as to the dry, resilient fibrous foam composition described in further detail below. One such characteristic, fire retardancy, may be imparted to the aerated fibrous slurry composition by including certain inorganic salts, e.g., borax, ammonium phosphate, and ammonium sulfate, as a fire retardant. Another characteristic is neutral pH. Certain natural fibrous materials, such as wood fibers, impart an acid pH to the aerated fibrous slurry composition (as low as pH 4.5 from oak fibers). The acidity of the composition may be reduced or neutralized by including conventional materials which are slightly basic, e.g., soda ash. Other suitable additives include detergent builder, odorants, fungicides, water repellants, dyes, epoxy resins and polyester resins. The dyes are preferably water-soluble to pretint the fibrous slurry composition and produce a desired color. Each additive may be used in conventional amounts, which are easily determined by persons having ordinary skill in the art.

In another embodiment of the invention, there is provided a dry, resilient fibrous foam composition which comprises an aerated fibrous slurry composition described above, dried to a water content of not more than 10% by weight and to a density of 0.005 to 0.50 g/cc. The aerated fibrous slurry composition from which this dry, resilient fibrous foam composition may be produced suitably comprises 10 to 10,000 parts by weight of fibrous material comprising fibers from 1 to 20 mm in length; 0.5 to 25 parts by weight of foaming agent; 1 to 50 parts by weight of stabilizer; 500 to 25,000 parts by weight of water; and a volume of gas equal to 5 to 1,000% of the volume of the fibrous slurry composition. Among the suitable formulations of this dry, resilient fibrous foam composition are those having a density of 0.05 to 0.30 g/cc (these comprise at least 75% by volume of gas) or 0.02 to 0.20 g/cc.

The gas incorporated into the aerated fibrous slurry composition reduces the net density of the resulting dry, resilient fibrous foam composition and raises its strength to weight ratio. The stabilizers of the aerated fibrous slurry composition also serve to strengthen the dry, resilient fibrous foam composition.

The fibrous materials, foaming agents, stabilizer and optional components which are suitable for the dry, resilient fibrous foam composition include those identified above for the aerated fibrous slurry composition.

The dry, resilient fibrous foam composition may have a rebound of from 2 to 25%. The dry, resilient fibrous foam composition may be formed into many alternative shapes and sizes. In a sheet form, this composition may suitably be used as a layer of insulation against heat loss; or as a ground cover to protect seeds or seedlings, to prevent weed growth, to cover land fills, or to prevent soil erosion. In a small chip form, the dry, resilient fibrous foam composition may suitably be used as cushioning material for packaging.

When cross-sectional samples of the dry, resilient fibrous foam composition are viewed, a substantial number of the fibers of the fibrous material are seen to be oriented parallel to one another: from 45 to 99% of the fibers of the fibrous material may be seen in this parallel orientation. This orientation imparts a laminar appearance to the cross-section of the composition. Without in any way limiting the invention, Applicants wish to express their opinion that this parallel orientation of the fibrous material imparts a laminated structure to the dry, resilient fibrous foam composition; reinforcing the composition and enhancing its cohesion.

In yet another embodiment, there is provided a method for making the aerated fibrous slurry composition comprising adding the fibrous material, stabilizer, foaming agent, water and optional components, if any, to a vessel; soaking the fibrous material, foaming agent, stabilizer, and optional components, if any, in the water until substantially moistened, usually for about 5 minutes; stirring the water to disperse the fibrous material, foaming agent, stabilizer and optional components, if any, through the water, thus forming a fibrous slurry composition; and agitating the fibrous slurry composition to incorporate a volume of gas, equal to 10 to 900% of the volume of said fibrous slurry composition prior to said agitating. The resulting aerated fibrous slurry composition has a volume which is 1.05 to 10-fold greater than that of the fibrous slurry composition. For convenience, the fibrous material, foaming agent, stabilizer and optional Component, if any, may be pre-mixed; later, this pre-mix may be added to water on the site where the aerated fibrous slurry composition is to be used.

The dry, resilient fibrous foam composition may be made by a method comprising making the aerated fibrous slurry composition, and drying the aerated fibrous slurry composition to a water content of not more than 10% by weight and to a density of 0.005 to 0.50 g/cc. The aerated fibrous slurry composition may be dried in any conventional manner, as for example by heating it at from 90 to 200° F. or by holding it in a low humidity atmosphere. Heating at a temperature of greater than 200° F. tends to destroy the structure of the aerated fibrous slurry composition and so to produce an inferior dry, resilient fibrous foam composition.

In still a further embodiment of the invention, there is provided a dry, resilient fibrous foam composition divided into small pieces from 1 mm to 10 cm in size. These pieces may suitably serve to cushion fragile objects. There is further provided an object having multiple surfaces with at least one of said surfaces having affixed thereto at least one layer from 1 to 20 cm thick of the dry, resilient fibrous foam composition. Heat insulating qualities are imparted to these objects by the one or more layers of dry, resilient fibrous foam composition. Objects which may desirably be treated to have the dry, resilient fibrous foam composition affixed thereto include materials used in buildings, ships and airplanes. The layer of dry, resilient fibrous foam composition may incorporate fire retardant agents. Whereas conventional cellulose insulation materials employ 35 to 45 parts by weight of a fire retardant agent, the dry, resilient fibrous foam composition comprises from approximately 10 to approximately 25 parts by weight of fire retardant.

The one or more layers of dry, resilient fibrous foam composition may be affixed to surfaces of the object in any manner deemed acceptable to persons skilled in the art. For example, a sheet of the composition may be affixed using mechanical or chemical means, such as staples or glue respectively. Alternatively, when the layer of dry, resilient fibrous foam composition is formed by applying aerated fibrous slurry composition to a surface of the object, no affixing means are necessary, since the aerated fibrous slurry composition adheres during and after drying to the surfaces to which it has been applied.

There is also provided a method of restricting objectionable vapors emanating from a source such as a land fill, or a leaking or spilled transport container. The method comprises applying to the vapors' source one or more layers of the aerated fibrous slurry composition. The method may also restrict objectionable vapors emanating from bodies of water, such as stagnant lagoons, because the aerated fibrous slurry composition, being much lighter than water, floats when applied to water. Vapors from such sources often have objectionable aromas or effects, such as irritating the eyes or skin. This method comprises applying to the source of the objectionable vapors one or more layers of the aerated fibrous slurry composition. If the layer of aerated fibrous slurry composition is applied to the entire vapor source (or to a part of the vapor source from which the majority of the vapor is released), and is sufficiently thick, the layer will restrict emanation and dispersion of the vapors. Suitable thicknesses for the one or more layers of the aerated fibrous slurry composition in this method may vary from 1 to 20 cm.

In yet a further embodiment of the invention, there is provided a method of trapping a spilled liquid comprising applying to the surface of said liquid a layer from 1 to 20 cm thick of the aerated fibrous slurry composition.

There is further provided a method of absorbing a spilled liquid comprising applying to the surface of the liquid, pellets of the dry, resilient fibrous foam composition. There is also provided a method of imparting insulating qualities to an object comprising affixing to at least one surface of said object one or more layers of the dry, resilient fibrous foam composition.

Another embodiment provides a liquid absorbing composition comprising 1,000 to 4,000 parts by weight of the aerated fibrous slurry composition and 250 to 600 parts by weight of a solid carrier. The carrier may be selected from the group consisting of ground newsprint, ground wood and super-absorbent polymer. Generally, there is a 10:1 ratio between the weight of the carrier and fibrous material present in the aerated fibrous slurry composition.

The liquid absorbing composition is made by mixing 1,000 to 4,000 parts by weight of the aerated fibrous slurry composition, made as described above, into 250 to 600 parts by weight of a carrier. The resulting semi-dry mixture is then formed into pellets by any conventional steps, as for example by brushing the semi-dry mixture through a screen. The resulting pellets are dried as in a kiln oven. In contrast to the drying of the aerated fibrous slurry composition to form the dry, resilient fibrous foam composition, there is no maximum heating temperature in drying the semi-dry mixture. It is noted however that drying above 250° F. generally is not necessary given the size of the pellets. The size of the liquid absorbing composition pellets is suitably a size making them easy to dispense onto liquids, efficient in absorbing the liquid and simple to clean up after the liquid has been absorbed. Suitable pellet sizes thus include from 2 to 50 mm. The pellets of the liquid absorbing composition, held together by the dried aerated fibrous slurry composition, are able to absorb at least 10 to 15 times their weight in liquid.

DETAILED DESCRIPTION OF THE PREFERRED EMBODIMENTS

The fibrous materials of the aerated fibrous slurry composition comprise natural or synthetic fibers from about 1 to about 20 mm or alternatively 5 to 15 mm in length. Fibrous materials which are less than 1 mm in length generally do not impart sufficient viscosity to the composition to form a stable slurry; fibrous materials which are more than 20 mm in length, while generally usable, may, depending on the fibrous material, impart excessive viscosity to the composition thus rendering processing of the composition difficult. Accordingly, fibers longer than 20 mm are generally not used.

The foaming agent of the aerated fibrous slurry composition may suitably be one selected from the group consisting of anionic, nonionic and cationic surfactants. The choice of foaming agent affects the wettability of the fibrous material to be dispersed in the aerated fibrous slurry composition. Fibrous materials such as paper and cellulose tend to be slightly hydrophobic and so are more easily dispersed in water in the presence of a good wetting agent such as an alkyl aryl sulfonate. In fact, alkyl aryl sulfonates are generally used as the foaming agent of the aerated fibrous slurry composition because they generate substantial amounts of foam in water upon agitation.

Some formulations of the aerated fibrous slurry composition may include components which tend to destabilize foam from anionic surfactants such as alkali metal salts of fatty acids. Thus, when multivalent salts, such as fire retardant agents, oils or perfumes are present, the foaming agent used may suitably be a synthetic anionic surfactant such as an alcohol sulfate or alkyl aryl sulfonate, or a nonionic surfactant. Foam from nonionic or synthetic anionic surfactants is generally not destabilized by such compounds.

The foaming agent in the aerated fibrous slurry composition also affects the wettability of fibers in the dry, resilient fibrous foam composition. The dry, resilient fibrous foam composition is to be wetted after drying in certain cases, as for example where the fibrous material is glass fiber with resin. It has been found that when the foaming agent is a cationic surfactant, the wettability of the dry, resilient fibrous foam composition's fibrous material is improved.

The water incorporated in the aerated fibrous slurry composition may suitably be any fresh water available, even if it contains high mineral content. High levels of minerals generally have no deleterious effect on the formation or use of the aerated fibrous slurry composition. However, in order to assure that high mineral content imparts no undesirable effect, one may incorporate greater amounts of foaming agent than when lower mineral content water is used, to offset possible complexing of foaming agent ions by mineral ions (typically $Ca^{2+}$ and $Mg^{2+}$). Alternatively, one may further incorporate detergent "builder" compounds well known from the detergent art in the aerated slurry composition to sequester mineral ions. Suitable builders such as sodium phosphate may be incorporated in the composition at levels of 1 to 15% by weight.

The gas to be incorporated into the aerated fibrous slurry composition may be any gas which is substantially chemically inert with respect to the other components of the composition. Air is substantially inert with respect to these components, as well as being inexpensive and readily available; therefore, air is generally the gas which is incorporated into the slurry.

The incorporation of gas usually is performed after the fibrous slurry composition is formed, i.e., after the fibrous material, foaming agent, stabilizer and optional components, if any, have been thoroughly dispersed in the water and water-soluble components (e.g. the foaming agent) have dissolved. Gas incorporation is performed until the fibrous slurry composition has a density of 0.2 to 0.6 g/cc, is generated.

The incorporation of gas may be performed using high speed dispersion mixers, pump/motionless mixer combinations, medium speed propellers and paddle-type mixers well known in the art. The specified mixers generally have mixing vessels with a volume of from 100 to 50,000 liters. Persons skilled in the mixing art may select among these and other conventional mixers, depending on the type of mixing, the specific product and the amount of product which is desired.

Mixer operating speeds vary with the size of the batch being mixed. Accordingly, it is difficult to provide a speed of operation which applies uniformly to all batch sizes. Persons skilled in the art are able to select appropriate operating mixer speeds. When a high speed disperser is used to mix the components of the aerated fibrous slurry composition, the blade of the mixer may be raised to the top of the mix in order to incorporate gas and generate the aerated fibrous slurry composition.

It is found that a high speed dispersing pump is a more efficient mixer than propeller-type mixers in two respects: first, there are fewer unmixed portions with a dispersing pump; second, the pump is more portable than propeller mixers. Thus, one may mix the components of the aerated fibrous slurry composition at the site of application with a portable dispensing pump and apply freshly mixed aerated fibrous slurry composition in agricultural fields immediately after seeds are sown. This is particularly desirable where the aerated fibrous slurry composition is a formulation which must be applied immediately following preparation, such as those omitting stabilizer, as described above.

The viscosity of the aerated fibrous slurry composition after incorporation of gas desirably is from 500 to 5,000 centipoises. With this viscosity, the aerated fibrous slurry composition may be handled at efficient speeds by industrial machinery, yet still tends to adhere to the surfaces to which it is applied.

Once the aerated fibrous slurry composition is formed, it may be handled using conventional techniques and equipment well known to those skilled in the art. Thus, after formation in the vessel, the aerated fibrous slurry composition may be extruded, vacuum formed, injection molded, cast, spread, or calendared into a variety of shapes and sizes, packaged for storage or shipment, or transformed into dry, resilient fibrous foam composition.

The aerated fibrous slurry composition has numerous uses. It may be used to trap objectionable fluids such as pollutants present on land. Application of a layer of the aerated fibrous slurry composition, in a layer from 1 to 20 cm thick, helps trap fluid pollutants by slowing their spread. Moreover, if the pollutant is inflammable, the layer of aerated fibrous slurry composition on top the pollutant helps greatly to prevent the pollutant bursting into flame.

The aerated fibrous slurry composition may also be employed as a ground cover. The effect of the ground cover will be determined by the thickness and composition of the aerated fibrous slurry composition. A relatively thin cover of from 0.1 to 1.5 cm thick will conceal freshly sown seeds from animals which might otherwise eat them. When dry however, the composition will be permeable to air and moisture such that seedlings beneath the cover can germinate and grow through the cover. A cover from 2 to 4 cm thick will, when dry, produce a layer which permits only limited air and moisture to reach the ground beneath; this thickness may be used to prevent weed growth, for example in the empty rows between sown seeds or growing crops. Generally, applying from 200 to 400 pounds of aerated fibrous slurry composition per acre will provide sufficient ground cover.

Layers of aerated fibrous slurry composition 4 cm or more thick may be applied to restrict emanation of objectionable vapors from land, as from a land fill or to halt soil erosion. Generally, applying from 1,000 to 2,500 pounds of aerated fibrous slurry composition per acre. After the aerated fibrous slurry composition has dried, the resulting layer remains in place and retains it structural integrity for up to several months, even following heavy rains and winds, and thus also help prevent soil erosion.

Depending on its composition, the dry, resilient fibrous foam composition may be a flexible sheet resembling nonwoven fabric (when levels of fibrous material and stabilizer are relatively low) or a rigid sheet (when levels of fibrous material and stabilizer are high).

In certain formulations of the dry, resilient fibrous foam, the composition comprises a specific volume of gas, e.g., 50 to 75% by volume of gas. The volume of gas in the dry, resilient fibrous foam composition is virtually predetermined by the increase in the volume of the fibrous slurry composition during incorporation of gas. The final dry, resilient fibrous foam composition exhibits little or no shrinkage from the volume achieved during the foaming step. The gas incorporated therein forms gas-filled cavities which impart to the dried form of the aerated fibrous slurry composition good heat insulating qualities.

The water content of the dry, resilient fibrous foam composition is measured as follows: a sample of the dry, resilient fibrous foam composition is weighed, oven dried at 185° F. until its weight no longer decreases, and re-weighed. The difference between the sample's starting and ending weights is the moisture content, expressed as percent of the final dry weight.

The dry, resilient fibrous foam composition may have a "rebound" of 2 to 25%. Rebound is a measure of the resilience of compressible solids. It is measured by applying to the surface of the dry, resilient fibrous foam composition a weight of one pound per square inch. This weight is removed after one hour, at which time, the depth of the impression caused by the 1 lb./sq. inch weight is measured. Fifteen minutes later, the depth is again measured. After the second measurement, the 1 lb./sq. inch weight is again returned to the same position on the surface of the dry, resilient fibrous foam composition for another 12 hours, after which the two depth measurements are again made. The weight is again replaced and the measurements are again made 24 hours after the first placement of the weight upon the foam. For each pair of measurements, the depression's depth fifteen minutes after the weight is removed is subtracted from the initial depth measurement. The difference, if any, between these depths is the distance which the depressed surface rose in the fifteen minutes after the weight's removal. Each difference is divided by the first depth measurement value and multiplied by 100. Thus, if a first depth measurement was 5.0 mm and, fifteen minutes later, the depth were 4.5 mm, the difference (0.5 mm) would be divided by 5.0 mm and multiplied by 100 to give a 10% value. The percentage values calculated from the three measurements are averaged to yield the rebound value for the dry, resilient fibrous foam composition.

When the fibrous material and stabilizer used in the aerated fibrous slurry composition are biodegradable, e.g., when the fibrous materials are cellulose-based, the dry, resilient fibrous foam composition is biodegradable. That is, when the fibrous material, foaming agent and other components are biodegradable, then upon exposure to the elements, the dry, resilient fibrous foam composition breaks down the composition over time. When one or more components of the dry, resilient fibrous foam composition is not biodegradable, then, upon exposure to the elements, the composition may lose its structure and degrade into its components.

This biodegradability, or degradability, imparts several advantages to the aerated fibrous slurry and the dry, resilient fibrous foam compositions. Cushioning materials formed from the dry, resilient fibrous foam composition are considered to be a significant improvement in that they degrade more quickly than conventional styrofoam chips. Furthermore, biodegradability is a significant advantage of the dry, resilient fibrous foam composition over conventional cloth ground covers, in that the former biodegrades in one season or less. By contrast, conventional ground covers, such as burlap or oak chips, can last far longer and, as a result, must be retrieved from fields. If cloth covers are not retrieved from fields, they snag in cultivating machinery passing over them. Oak chips have the further undesirable characteristic of imparting an acidic pH as low as 4.5 the longer they are in contact with soil. Ground cover made of the dry, resilient fibrous foam composition may be formulated to have neutral pH.

Objects may be cushioned or given heat insulating ability by applying aerated fibrous slurry composition. The application step may be carried out by spraying or any other suitable delivery step known to those skilled in the art. The thickness of the layer to be applied varies with the contemplated use. Thus, in order to insulate effectively against heat loss, the thickness of the layer of aerated fibrous slurry composition which is applied is from about 1 to about 20 cm thick, usually 5 to 15 cm thick. By contrast, the layer of aerated fibrous slurry composition to be applied in order to cushion fragile materials is from 0.5 mm to 10 cm, or 1 mm to 5 cm thick. These thinner layers of the slurry composition, when dry, generally provide sufficient cushioning so that fragile materials may be shipped without risk of damage or breakage.

Moreover, the dried slurry composition has the advantage of adhering to all parts of the object coated, yet is also easily removable by cutting or breaking from the object. If any portions of the dry, resilient fibrous foam composition remain, they may be removed easily by washing in water since the foaming agent present in the composition enhances wettability.

The present invention is described in the following Examples, which are set forth for the purposes of illustration only. It will be apparent to one of ordinary skill in the art that many changes and modifications may be made to the invention without departing from the spirit or scope of the invention as set forth herein.

EXAMPLE 1

100.0 kg ½ mesh ground newsprint
2.5 kg Naccanol 90G (Stepan Chem Co.)
5.5 kg Gel-Cel calcium polyacrylate fiber (Gleason Fibers)
1,700.0 liter Water The ground newsprint, Naccanol 90G and super-absorbent polyacrylate, as stabilizer, are soaked and dispersed in water with a high speed disperser (Cowles type) blade at 3,600 rpm for 10 minutes, forming a fibrous slurry composition. The blade is raised to the top of the vessel contents to generate 100% volume gain as foam. The aerated fibrous slurry composition is extruded and dried by exposure in an oven to temperatures of 190° F. for approximately 60 minutes until water content is not more than 10% by weight. The resulting dry, resilient fibrous foam composition has a density of 0.08 g/cc, compression characteristics of 10% (500 g/16 mm$^2$) and a rebound to 7%. This dry, resilient fibrous foam composition is suitable for use in place of conventional foamed polystyrene packaging products.

EXAMPLE 2

100.0 kg ¼ mesh ground corrugated waste paper
6.0 kg Triton CG-110 (Union Carbide): ethylene oxide condensate
5.0 kg Sodium Alginate (Kelco Div. Merck)
1,500.0 liter Water The first three components are mixed and ground through a hammermill to effect complete dry mixing; the dry mixture may then be packed in bags and later shipped for further mixture with water. The dry mix is combined with the water using dispersion equipment (disperser blade or gear pump). This further mixing occurs at 300 rpm for 20 minutes to incorporate a volume of air equal to 600% of the unagitated fibrous slurry composition. The resulting aerated fibrous slurry composition is sprayed in a layer 2.5 cm thick for use as a land-fill cover. The final product has high water retention, high wind resistance and sufficient strength to resist elements and prevent soil erosion.

EXAMPLE 3

100.0 kg chopped Fiberglass (Dow Corning) (6.2 mm in length)

5.0 kg Naccanol ME-DRY (Stepan Chem. Co.)
2,000.0 liter Water

The fiberglass and Naccanol ME-DRY are dispersed in water and agitated to generate a 100% gain in volume at 250 rpm for 30 minutes to incorporate a volume of air equal to 100% of the unagitated fibrous slurry composition. The resulting aerated fibrous slurry composition is poured into molds and allowed to dry. The resulting dry, resilient fibrous foam composition, formed into desired shapes, is impregnated with liquid resin such as polyester or epoxy resin.

EXAMPLE 4

100.0 kg ground waste paper (6.2 mm by 6.2 mm)
3.0 kg Aerosol OS (American Cyanamid): alcohol sulfate
1.0 kg Calcium Polyacrylate Powder (Rohm & Haas)
30.0 kg Borax
2,500.0 liter Water The paper, borax, calcium polyacrylate and Aerosol OS are mixed and ground together as in Example 2, then dispersed in the water using a disperser blade or gear pump and agitated according to Example 2. The resulting aerated fibrous slurry composition is applied using stucco type spray equipment in layers 2.5 cm thick per pass to standard construction plasterboard until a layer 15 cm thick accumulates. After drying to a water content of not more than 10%, it adheres to the plasterboard and has a density of 0.02 g/cc and a very high R value (Insulation value) passing current specifications for cellulose insulation.

EXAMPLE 5

50.0 kg ¼ ground newsprint
10.0 kg Witconate SK (Witco Chem Co.)
10.0 kg Carboxymethyl Cellulose (Dow Chem.)
1.0 kg soda ash
2,000.0 liter Water
500.0 kg ground wood (3.1 to 6.2 mm by 3.1 to 6.2 mm)

The Witconate, carboxymethyl cellulose, and soda ash are added to the water in a horizontal type mixer, soaked and dispersed, then the ground newsprint is added. The resulting fibrous slurry composition is then mixed at 100 rpm for 45 minutes to incorporate a volume of air equal to 25% of the volume of the unagitated fibrous slurry composition. The resulting aerated fibrous slurry composition is then added to the ground wood to form a semi-dry mixture. This semi-dry mixture is brushed through 6.2 mm wire screen, to agglomerate into pellets (3.1 to 6.2 mm in diameter) and dried in a kiln oven at 210° F. The dry pellets have dry packed density of 0.12 to 0.14 g/cc and absorbency in the range of 10:1 liquid to absorbent. These liquid absorbent pellets may be used to absorb oil and nonaggressive aqueous spills.

I claim:

1. An aerated fibrous slurry composition consisting of
   a) a fibrous slurry composition consisting of:
      10 to 2,500 parts by weight of said composition of fibrous material consisting of fibers from 1 to 20 mm in length;
      0.5 to 25 parts by weight of said composition of foaming agent;
      1 to 50 parts by weight of said composition of stabilizer; and
      500 to 25,000 parts by weight of said composition of water;
      wherein said fibrous material, foaming agent and stabilizer together constitute the dry components of said fibrous slurry composition, said dry components constituting 1 to 10% by weight of said fibrous slurry composition; and
   b) a volume of gas, equal to 5 to 1,000% of the volume of said fibrous slurry composition, incorporated into said fibrous slurry composition to form said aerated fibrous slurry composition having a density of 0.2 to 0.6 g/cc,
      wherein said stabilizer is selected from the group consisting of starch, proteins, lignin, sodium alginate, calcium polyacrylate and carboxymethyl cellulose.

2. An aerated fibrous slurry composition according to claim 1 consisting of
   a) a fibrous slurry composition consisting of:
      35 to 1,500 parts by weight of said fibrous material;
      1.5 to 12 parts by weight of said foaming agent;
      5 to 20 parts by weight of said stabilizer; and
      1,000 to 20,000 parts by weight of water;
      wherein said fibrous material and said stabilizer together comprise at least 60% by weight of said dry components' weight, and said dry components comprise 3.5 to 7.5% by weight of said fibrous slurry composition; and
   b) a volume of gas, equal to 10 to 900% of the volume of said fibrous slurry composition, incorporated into said fibrous slurry composition to form said aerated fibrous slurry composition having a density of 0.25 to 0.40 g/cc.

3. The composition of claim 2 wherein said fibrous material comprises fibers from 5 to 15 mm in length which are selected from the group consisting of paper, wood, cellulose, hemp, cotton, wool, silk, ramie, bagasse, nylon, glass, acrylic, olefin, polyester and super-absorbent polymeric fibers.

4. The composition of claim 3 wherein said fibrous material is ground newsprint.

5. A composition comprising the composition of claim 2 and one or more additives selected from the group consisting of borax, ammonium phosphate, ammonium sulfate, odorants, fungicides, water repellants, dyes, epoxy resins and polyester resins.

6. A dry, resilient fibrous foam composition consisting of the aerated fibrous slurry composition of claim 1 dried to a water content of not more than 10% by weight and to a density of 0.005 to 0.50 g/cc.

7. A dry, resilient fibrous foam composition consisting of the aerated fibrous slurry composition of claim 2 dried to a water content of not more than 10% by weight and a density of 0.05 to 0.30 g/cc and comprising at least 75% by volume of gas.

8. A dry, resilient fibrous foam composition consisting of the aerated fibrous slurry composition of claim 4 dried to a water content of not more than 10% by weight and a density of 0.02 to 0.20 g/cc.

9. The composition of claim 8 having a rebound of from 2 to 25%.

10. Cushioning material for packaging comprising chips formed from the composition of claim 8.

11. A method for making the aerated fibrous slurry composition of claim 1, consisting of
    adding fibrous material, foaming agent, stabilizer and water to a vessel;
    soaking said fibrous material, stabilizer and foaming agent in said water until substantially moistened; p1 stirring said water to disperse said fibrous material, foaming agent, and stabilizer through said water to form a fibrous slurry composition; and agitating said fibrous slurry composition to incorporate therein a volume of gas equal to 5 to 1,000% of the volume of said fibrous slurry composition prior to said agitating.

12. A method for making a dry, resilient fibrous foam composition consisting of making the aerated fibrous slurry composition according to claim 11; and drying said aerated fibrous slurry composition to a water content of not more than 10% and a density of 0.005 to 0.50 g/cc.

13. An aerated fibrous slurry composition consisting of a) a fibrous slurry composition consisting of:
10 to 2,500 parts by weight of said composition of a super-absorbent material consisting of fibers from 1 to 20 mm in length;
0.5 to 25 parts by weight of said composition of foaming agent; and
500 to 25,000 parts by weight of said composition of water;
wherein said super-absorbent material and foaming agent together constitute the dry components of said fibrous slurry composition, said dry components constituting 1 to 10% by weight of said fibrous slurry composition; and b) a volume of gas, equal to 5 to 1,000% of the volume of said fibrous slurry composition, incorporated into said fibrous slurry composition to form said aerated fibrous slurry composition having a density of 0.2 to 0.6 g/cc.

14. The composition of claim 13 wherein said super-absorbent material is calcium polyacrylate.

* * * * *